(12) United States Patent
Wolters et al.

(10) Patent No.: US 10,912,247 B2
(45) Date of Patent: *Feb. 9, 2021

(54) MACHINE GUIDANCE FOR OPTIMAL WORKING DIRECTION OF TRAVEL

(71) Applicant: CropZilla, Inc, Columbus, OH (US)

(72) Inventors: Dustin J. Wolters, Columbus, OH (US); Brian H. Watkins, Dublin, OH (US); Michael J. Thompson, Westerville, OH (US)

(73) Assignee: CropZilla Software, Inc., Columbus, OH (US)

( * ) Notice: Subject to any disclaimer, the term of this patent is extended or adjusted under 35 U.S.C. 154(b) by 135 days.

This patent is subject to a terminal disclaimer.

(21) Appl. No.: 16/435,980

(22) Filed: Jun. 10, 2019

(65) Prior Publication Data

US 2019/0289770 A1   Sep. 26, 2019

Related U.S. Application Data

(63) Continuation of application No. 15/490,791, filed on Apr. 18, 2017, now Pat. No. 10,368,475.

(Continued)

(51) Int. Cl.
*A01B 69/04* (2006.01)
*G01C 21/20* (2006.01)
*G05D 1/02* (2020.01)

(52) U.S. Cl.
CPC ........... *A01B 69/008* (2013.01); *G01C 21/20* (2013.01); *G05D 1/0217* (2013.01); *G05D 1/0219* (2013.01); *G05D 2201/0201* (2013.01)

(58) Field of Classification Search
CPC ........ A01L 369/008; G05D 2201/0201; G05D 1/0219; G05D 1/0217; G01C 21/20
See application file for complete search history.

(56) References Cited

U.S. PATENT DOCUMENTS

| 6,128,574 A | 10/2000 | Diekhans |
| 6,236,924 B1 | 5/2001 | Motz et al. |

(Continued)

FOREIGN PATENT DOCUMENTS

| CN | 102167038B B | 9/2013 |
| EP | 0821296 A2 | 1/1998 |

OTHER PUBLICATIONS

Bakhtian, et al., Optimal route planning of agricultural field operations using ant colony optimization, Agric Eng Int: CIGR Journal, Jan. 2011, pp. 1-10, 13 (4).

(Continued)

*Primary Examiner* — Hunter B Lonsberry
*Assistant Examiner* — Mathew Franklin Gordon
(74) *Attorney, Agent, or Firm* — Davis, Malm & D'Agostine, P.C.; Richard L. Sampson

(57) ABSTRACT

A system and method for determining the optimal machine working direction(s) of travel for a field boundary to be used in a guidance/navigation system for machine control includes, using specific field boundary information and machine specific information to spatially simulate travel path estimates over a plurality of splayed working directions of travel to determine the optimal working direction(s) of travel for the field boundary. Optimizing the spatial field efficiency by simulating travel path estimates to select an optimal working direction(s) of travel may then be used in accordance with a machine's guidance and/or navigation system, via an information transfer system, as the reference working direction(s) of travel for the machine to guide and control itself while performing fieldwork.

30 Claims, 13 Drawing Sheets

Related U.S. Application Data

(60) Provisional application No. 62/324,734, filed on Apr. 19, 2016.

(56) References Cited

U.S. PATENT DOCUMENTS

| | | | |
|---|---|---|---|
| 6,907,336 | B2 | 6/2005 | Gray et al. |
| 6,934,615 | B2 | 8/2005 | Flann et al. |
| 7,216,033 | B2 | 5/2007 | Flann et al. |
| 8,145,390 | B2 | 3/2012 | Dix et al. |
| 8,204,654 | B2 | 6/2012 | Sachs et al. |
| 8,214,111 | B2 | 7/2012 | Heiniger et al. |
| 8,285,459 | B2 | 10/2012 | Diekhans et al. |
| 8,296,052 | B2 | 10/2012 | Dix et al. |
| 8,498,788 | B2 | 7/2013 | Kondekar |
| 8,983,767 | B2 | 3/2015 | Pieper et al. |
| 9,417,632 | B2 | 8/2016 | Peake et al. |
| 2004/0193349 | A1 | 9/2004 | Flann et al. |
| 2009/0118904 | A1 | 5/2009 | Birnie |
| 2011/0112730 | A1 | 5/2011 | Rekow |
| 2012/0101725 | A1 | 4/2012 | Kondekar |
| 2014/0081568 | A1 | 3/2014 | Pieper et al. |
| 2014/0324345 | A1 | 10/2014 | Story |
| 2014/0371979 | A1 | 12/2014 | Drew et al. |
| 2016/0091898 | A1 | 3/2016 | Booher |

OTHER PUBLICATIONS

Tang, Lie, PhD, Optimized Coverage Path Planning and Headland Turning Trajectory Optimization for Auto-Steer Agricultural Field Equipment, Iowa State Univ., pp. 1-39.

Zandonado, R.S., Computational Tools for Improving Route Planning in Agricultural Field Operations, 2012, Theses & Dissertations—Biosystems & Agri Engineering, Paper 11.

Zhou, et al., Route Planning for Capacitated Agricultural Machines Based on Ant Colony Algorithms, 2015, Proceedings 7th Int'l Conf (HAICTA 2015) Kavala, Greece, pp. 163-173.

Jin, et al., Optimal Coverage Path Planning for Arable Farming on 2D Surfaces, 2010, Digital Repository @ Iowa State University, Agri & Biosystems Engineering, pp. 282-295.

Spekken, et al., Optimizing Path Planning by Avoiding Short Corner Tracks, Biosystems Eng Dept, College of Agriculture, Univ of Sao Paulo, Piracicaba, Sao Paulo, BR, 12 pages.

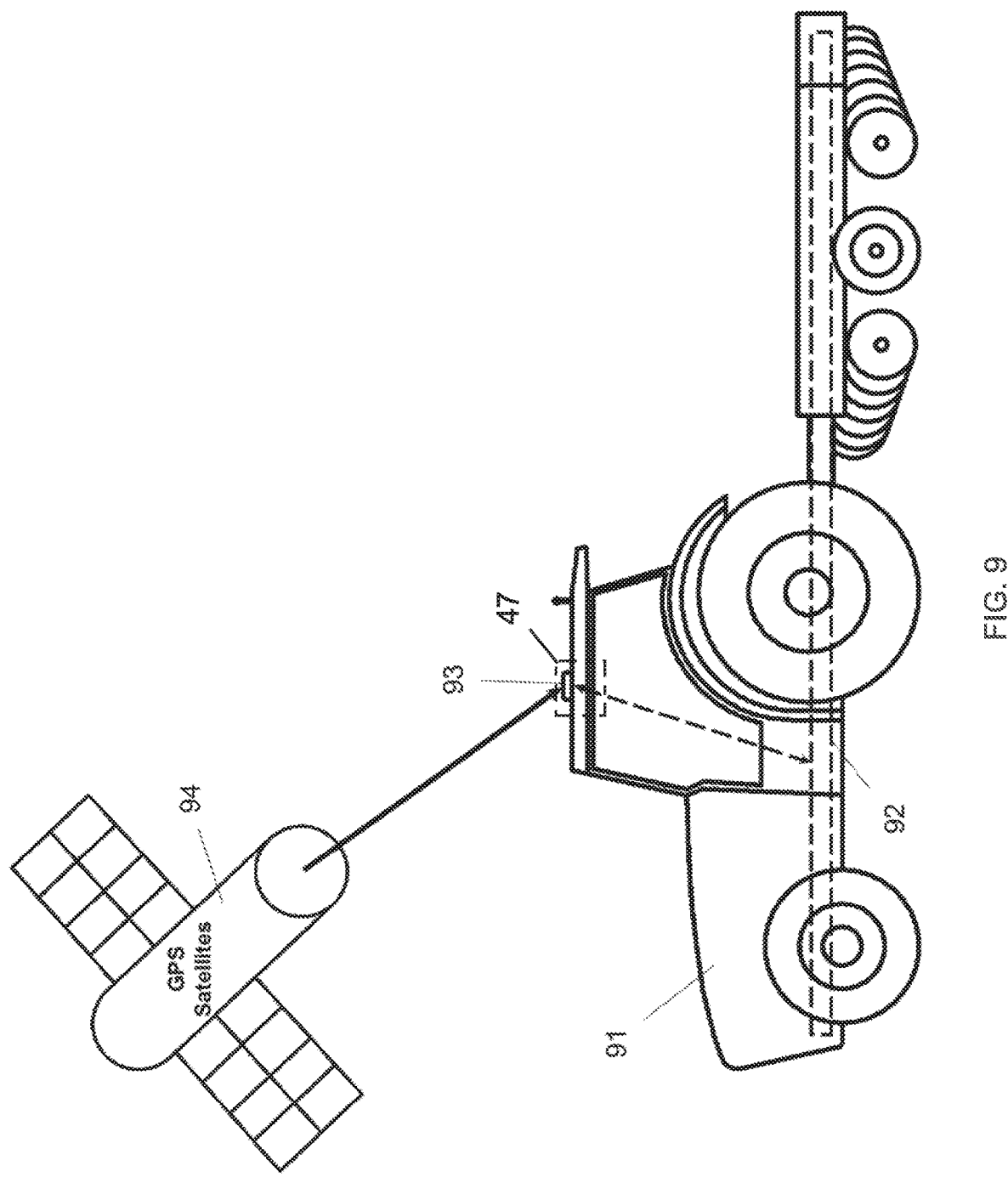

MACHINE GUIDANCE FOR OPTIMAL WORKING DIRECTION OF TRAVEL

RELATED APPLICATION

This application is a Continuation of U.S. patent application Ser. No. 15/490,791, entitled Machine Guidance for Optimal Working Direction of Travel, filed on Apr. 18, 2017, which claims the benefit of U.S. Provisional Patent Application Ser. No. 62/324,734, entitled System, Method, and Mechanism for Analyzing Spatial Field Efficiency and Determining Optimal Machine Working Direction(s) of Travel within a Field Boundary, filed on Apr. 19, 2016, the contents of which are incorporated herein by reference in their entirety for all purposes.

BACKGROUND

Technical Field

This invention relates to a machine control system for determining an optimal machine working direction(s) of travel within a field boundary for machine guidance, and more specifically, to a system and method that generates a simulated travel path estimate to calculate spatial field efficiency over a plurality of splayed initial working directions of travel.

Background Information

The problem of determining the most efficient route to take when farming a field is one that has challenged generations of farmers. Modern machine control promises to solve the problem, though despite many differing approaches, only limited success has been achieved.

One common approach is to attempt to generate a detailed work travel path for an entire field. One such example is U.S. Pat. No. 6,128,574, which describes a system for route planning and generation of a full work travel path by inputting at least one field specific datum, a work vehicle-specific datum, and optimization criteria. Using the vehicle and field characteristics along with the optimization criteria, the approach creates a full digitized work path that is compared to the GPS system of the working machine, during operation, to alert the operator when deviations in the course of the planned path occur so that the operator can manually correct the position of the work vehicle. A drawback of these full path approaches is that calculating the full route over the entire field relies on relatively large amounts of input data in order to generate accurate results, and requires a relatively large amount of processing resources. These aspects tend to adversely affect the speed with which routes are recalculated, such as when switching farm implements in the field.

U.S. Pat. No. 8,296,052 discloses a method for generating a swath pattern for a work vehicle to be driven in a region of a quadrilateral field in order to avoid point rows within the field. The swath pattern that is generated includes swaths that are parallel to opposite, non-parallel sides of the field, and includes swaths in the middle of the field that vary in longitudinal direction and width in order to compensate for the non-parallel orientation of the sides to eliminate point rows. While this approach may eliminate point rows, it tends to create some adverse operating conditions in the center section of the swath passes. Effectively adjusting the swath width, by enabling or disabling rows, may be impractical when using equipment with a fixed width. Combine equipment with a fixed width, a standing crop, and swath passes that have been adjusted so rows are disabled for less effective width and the problem turns into potentially destroying the standing crop instead of the swath pattern containing point rows.

Variations of the foregoing approaches include those described in the following patent documents. CN Pat. Pub. No. 102167038B discloses a mathematical model to generate an optimal full working path for a working machine and convex polygon field based on optimization criteria including smallest turning consumption (length), smallest number of turns, the shortest path, etc.

U.S. Pat. No. 8,214,111 describes an adaptive machine control system and method that adjusts a pre-planned path/route in real-time to compare the pre-planned path/route to the actual operation route for re-generation and adjustment to create a new optimal path/route.

U.S. Pat. Pub. No. 2016/0091898 discloses a control apparatus, system, and method which creates a travel path for an autonomously steering, or operator manned, machine through the use of data collection of previous travel paths.

U.S. Pat. No. 6,934,615 discloses a path determination module that partitions areas of the field based on minimizing internal economic costs of internal travel paths, determining a partition graph of the field based on external economic costs with regard to permutations of travelling from one partition to another, and then determining an order to serve the partition areas and internal paths based on all of the external and internal economic costs for all of the partitioned paths combined. This preferential path can then be used as the path planner in a vehicle controller and vehicle guidance system within the machine performing the field work.

Despite the many attempts and varied approaches, a need exists for an efficient machine control system and method that provides farm equipment with optimized working direction(s) of travel information for a wide range of field geometries quickly, while requiring relatively low levels of computing resources.

SUMMARY

An aspect of the invention includes a machine guidance apparatus for completing farming operations on a field with operational and spatial field efficiency. The apparatus includes an agricultural work machine configured for traversing the field; a farm implement operationally engaged with, and operated by, the agricultural work machine to effect farming operations as the agricultural work machine traverses the field; a GPS receiver disposed on the agricultural work machine; and a guidance system disposed on the agricultural work machine in communication with the GPS receiver. The guidance system has a memory and a processor, the memory including a stored program executable by the processor. The stored program is configured to capture a boundary and topographical features of the field, to generate a total farmable field area, and capture physical parameters of the farm implement, including a dimension transverse to forward movement of the agricultural work machine as the agricultural work machine traverses the field. The program is further configured to identify a parallel pass start point along the field boundary, usable by the agricultural work machine to begin farming operations with parallel passes traversing the field, to generate a plurality of splayed options for initial directions of travel from the parallel pass start point, and to generate a plurality of path estimates for the agricultural work machine to travel to cover the total farmable field area. Each of the path estimates extend from and include a plurality of passes parallel to a respective one of the splayed options. The program calculates a spatial field efficiency for each of the path estimates by comparing the farmable field area to the area covered by the farm implement when following the path estimates, using the formula:

Spatial Field Efficiency %=(Farmable Area of the Field)/(Area Covered by the Farm Implement) *100;

The program then selects the path estimate having highest spatial field efficiency and designates the splayed option of the path estimate having the highest spatial field efficiency as the desired initial working direction of travel, and instructs the agricultural work machine to commence farming operations by moving from the parallel pass start point in the desired initial working direction(s) of travel.

Another aspect of the invention includes a method for completing farming operations on a field with operational and spatial field efficiency. The method includes providing an agricultural work machine configured for traversing the field, the agricultural work machine including a GPS receiver and specialized machine guidance system including a memory and processor, the memory including a stored program executable by the processor. The method includes operationally engaging and operating a farm implement with the agricultural work machine, and executing the stored program to capture a boundary and topographical features of the field, to generate a total farmable field area, capture physical parameters of the farm implement, including a dimension transverse to forward movement of the agricultural work machine as the agricultural work machine traverses the field, identify an entrance point along the field boundary, usable by the agricultural work machine to enter the field, and generate a plurality of splayed options for initial working directions of travel from the parallel pass start point. A plurality of path estimates are generated for the agricultural work machine to travel to cover the total farmable field area, each of the path estimates extending from and including a plurality of passes parallel to a respective one of the splayed options. A spatial field efficiency is calculated for each of the path estimates by comparing the farmable field area to the area covered by the farm implement when following the path estimates, using the formula:

Spatial Field Efficiency %=(Farmable Area of the Field)/(Area Covered by the Farm Implement) *100;

The path estimate having highest spatial field efficiency is selected and the splayed option of the path estimate having the highest spatial field efficiency is designated as the desired initial working direction of travel. The agricultural work machine is instructed to commence farming operations by moving from the parallel pass start point in the desired initial working direction of travel.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 9 is a visualization of a working machine and its guidance/navigation system in accordance with embodiments of the present invention;

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. For example, reference to "an analyzer" includes a plurality of such analyzers. In another example, reference to "an analysis" includes a plurality of such analyses.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

Figure 11:
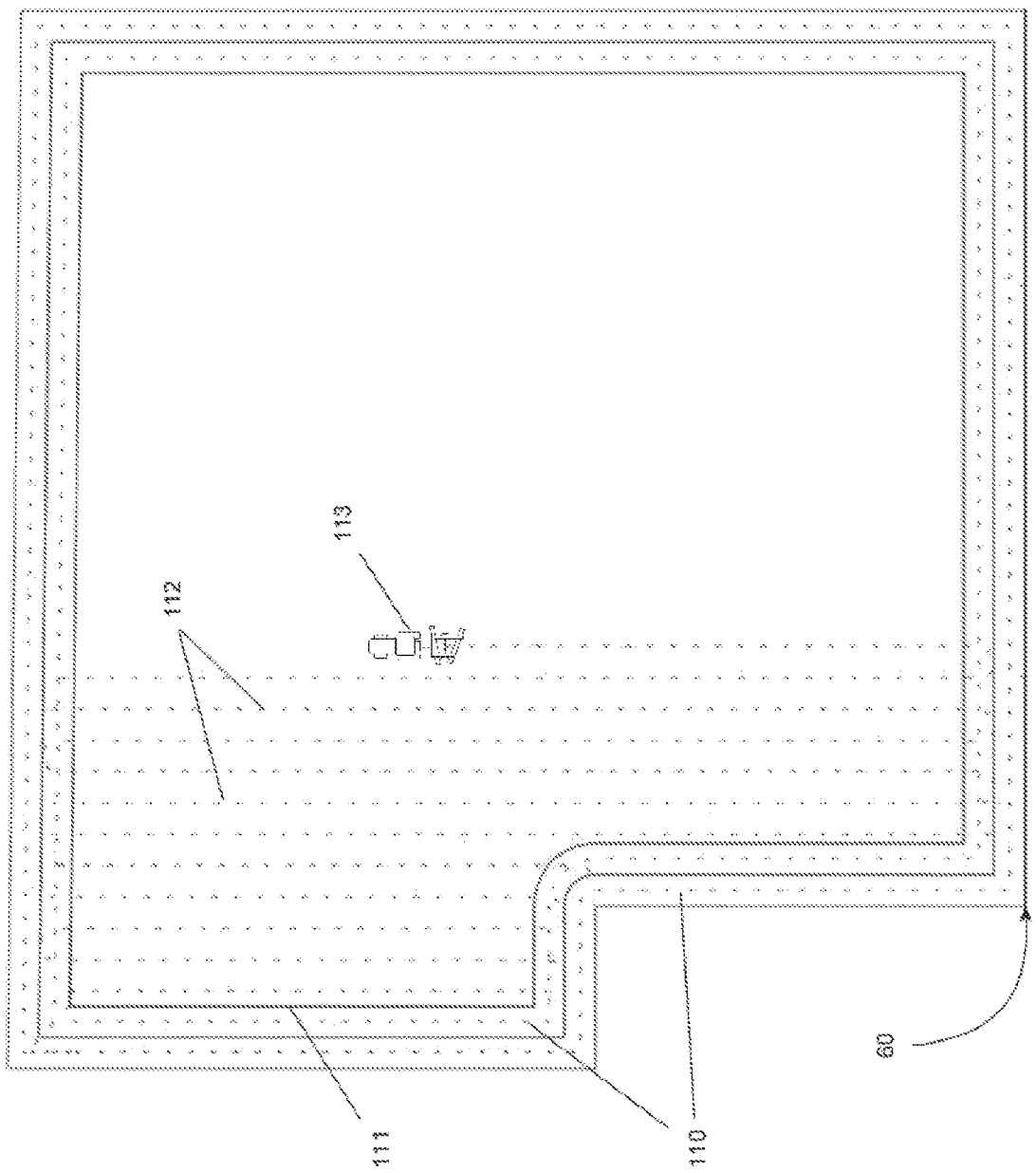
FIG. 11 is a visualization of a working machine being guided by the optimal working direction of travel within a field boundary in accordance with embodiments of the present invention.

Terminology

Where used in this disclosure, the term "axial" when used in connection with an element described herein, shall refer to a direction relative to the element, which is substantially parallel to its forward direction of travel when the element is installed on an agricultural work machine (e.g., tractor) 113 as shown in FIG. 11. Similarly, the term "transverse" refers to a direction other than substantially parallel to the axial direction. The term "computer" is meant to encompass a workstation, personal computer, personal digital assistant (PDA), wireless telephone, or any other suitable computing device including a processor, a computer readable medium upon which computer readable program code (including instructions and/or data) may be disposed, and a user interface. Terms such as "engine", "component", "module", and the like are intended to refer to a computer-related entity, including hardware or a combination of hardware and software. For example, an engine may be, but is not limited to being: a process running on a processor; a processor including an object, an executable, a thread of execution, and/or program; and a computer. Moreover, the various computer-related entities may be localized on one computer and/or distributed between two or more computers. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs.

Programming Languages

Embodiments of the present invention can be programmed in any suitable language and technology, such as, but not limited to: Assembly Languages, C, C++; C#; Python; Visual Basic; Java; VBScript; Jscript; Node.js; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Briefly described, embodiments of the present invention relate to an apparatus and method for machine control that generates an efficient/optimal initial working direction(s) travel for an agricultural work machine to take when farming a field, based on the particular geometry and topography of the field. More specifically, these embodiments generate a plurality of travel path estimates traversing the farmable area of the field, and then calculate spatial field efficiency for each of the path estimates. Each of the path estimates extends from one of a series of splayed options for initial working directions of travel extending from a field-specific parallel pass start point. As used herein, the parallel pass start point may be the entrance point at which the agricultural work machine enters the field. Alternatively, in the event the working machine enters the field and then creates a headland pass(es) along the field boundary, the parallel pass start point is a point along a completed headland pass at which the working machine is ready to begin farming operations on the remaining interior portion(s) of the field with a series of parallel passes. In particular embodiments, the parallel pass start point is either at the field entrance point or at a location in the field approximately the width of the headland pass(es) therefrom. The path estimate of the initial working direction(s) of travel having the highest spatial field efficiency is used to control operation of the agricultural work machine.

These embodiments thus determine an optimal initial machine working direction(s) of travel by analyzing spatial field efficiency given the field specific information including field geography, and machine specific information, for use directly in the guidance/navigation of a working machine (e.g., farm tractor with tools or implements) for machine control.

Particular embodiments use inputs such as field geography, including field boundary, its shape, size, and any interior obstacles, along with field specific information which may include the number of headland passes, the entrance and exit locations of the field, and also machine specific information such as the effective machine working width, machine speed, and machine description, to generate the travel path estimates. As mentioned above, the path estimate having the highest spatial field efficiency is used to determine which of the splayed options is optimal.

The optimal working direction(s) of travel may then be used in accordance with a machine's guidance and/or navigation system, via an information transfer system, as the reference working direction(s) of travel for the machine to guide itself and to otherwise follow while performing fieldwork. More specifically, the optimal working direction(s) of travel is converted into a format that the machine's guidance/navigation system can recognize and then entered into the guidance system of the working machine. As the machine performs field work, the guidance system in combination with the machine's steering system allows for control of the machine to follow the optimal working direction(s) of travel throughout the field.

An aspect of the invention was the recognition by the instant inventors that spatial field efficiency plays a large role relating to time, effort, machine capacities, and costs when farming an agricultural field. Excess distance and area covered when performing field work can be detrimental to spatial field efficiency, and ultimately, to the entire operational efficiency of the field. The inventors have recognized that working direction(s) of travel within a field boundary may be a defining factor that dictates the route/path of the machine working the field area, and may influence other factors such as the types of turns the machine must make in connecting swaths, and in many cases the swath order taken in order for complete coverage of the field area. With a vast majority of field boundaries being odd shaped, complex in nature, and containing any number of impassable interior topographical features/obstacles, along with the vast number of machine specific parameters that could be used, selecting an optimal path is complicated and often imprecise. However, the instant inventors have recognized that rather than attempting to generate detailed models covering every point in a path using large numbers of varying input types, the focus should be on determining the optimal initial working direction(s) of travel for the particular field geometry using a minimal set of machine parameters. The inventors recognized that this initial working direction(s) may effectively serve as a proxy for the remainder of the path, with subsequent path elements being largely dictated by the initial working direction(s) of travel.

Conventional approaches for path generation generally include choosing an initial working direction of travel that is parallel and adjacent to one of the (e.g., the longest) straight sides of the field, or choosing a working direction of travel that helps the machine finish in a certain location. The present inventors have discovered that while such conventional approaches may appear to be intuitively optimal, they are often sub-optimal and many times have a significantly adverse impact on the overall operational efficiency and cost. Embodiments of the present invention generate counterintuitive initial working direction(s) of travel that have generated surprisingly favorable results in terms of improved machine operational efficiency for various field geometries and topographies.

Figure 1:
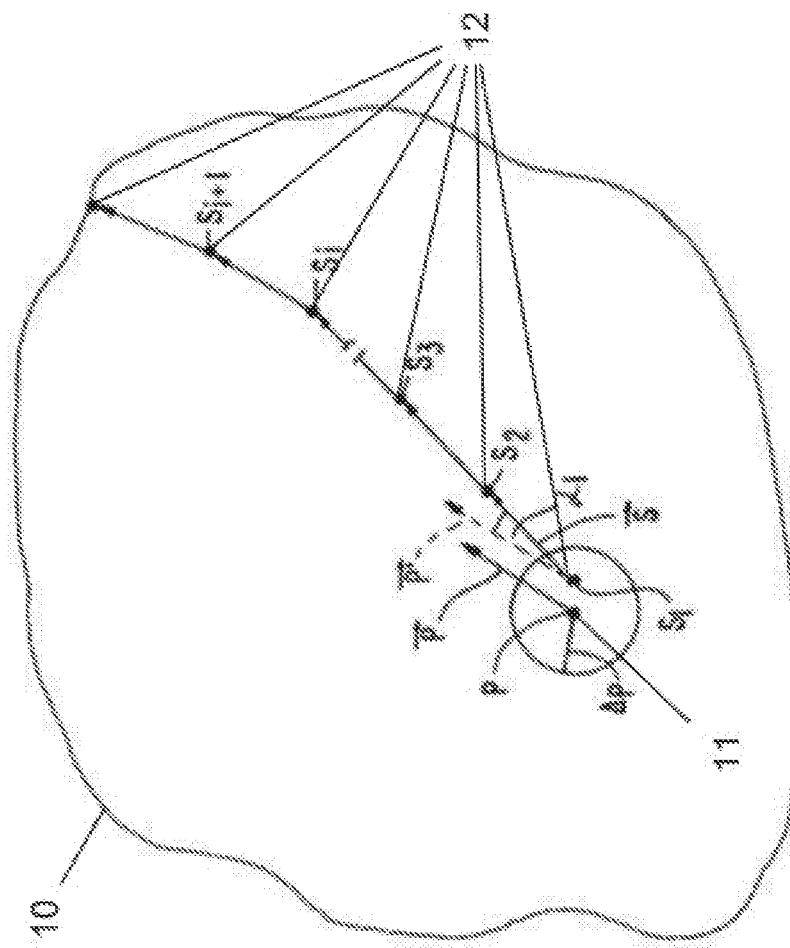
FIG. 1 is a section view visualization of a full planned/generated machine working path/route of the prior art.

As mentioned above, conventional approaches to path/route planning involve generating full start to finish path/routes that cover the entirety of the field. In this type of approach, substantially every direction, motion, and turn of the machine is dictated e.g., by a series of planned/generated waypoints that direct the machine during operation. FIG. 1 shows a partial view of such a full planned/generated machine working path/route 10. The momentary position of the machine 11 is shown along with a series of planned/generated waypoints 12 within a section view of the full path/route 10. These guiding waypoints 12 may be used by the system to make determinations about the machine operation in the field such as whether to circumnavigate the field in a clockwise or counter-clockwise fashion, the types of turns to make in a corner when faced with an acute, right, or obtuse angle, and even the order of occurrence of parallel swath passes.

Figure 2B:
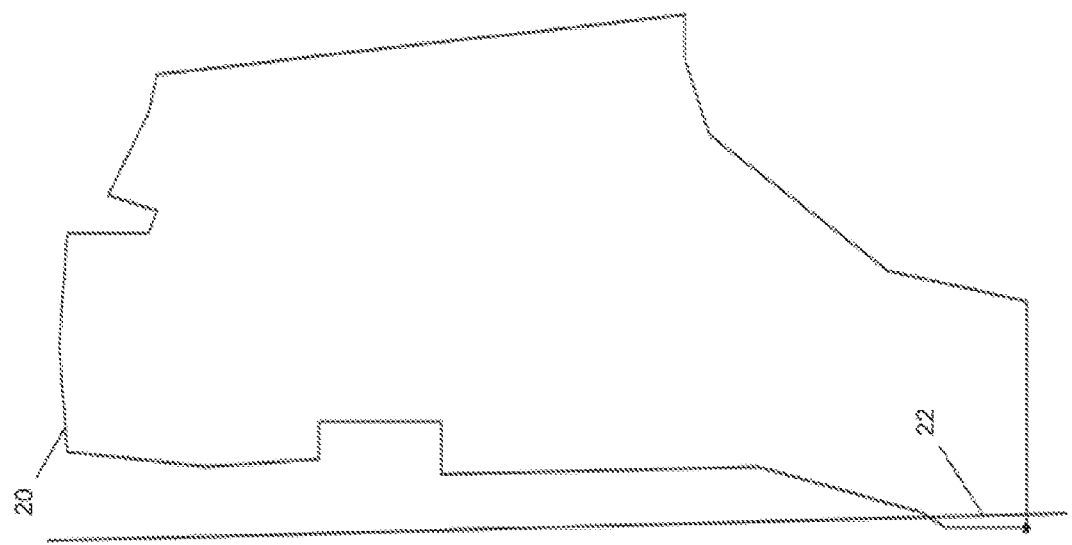
FIG. 2B is a visualization of an optimal working direction of travel as determined by embodiments of the present invention.
Figure 2A:
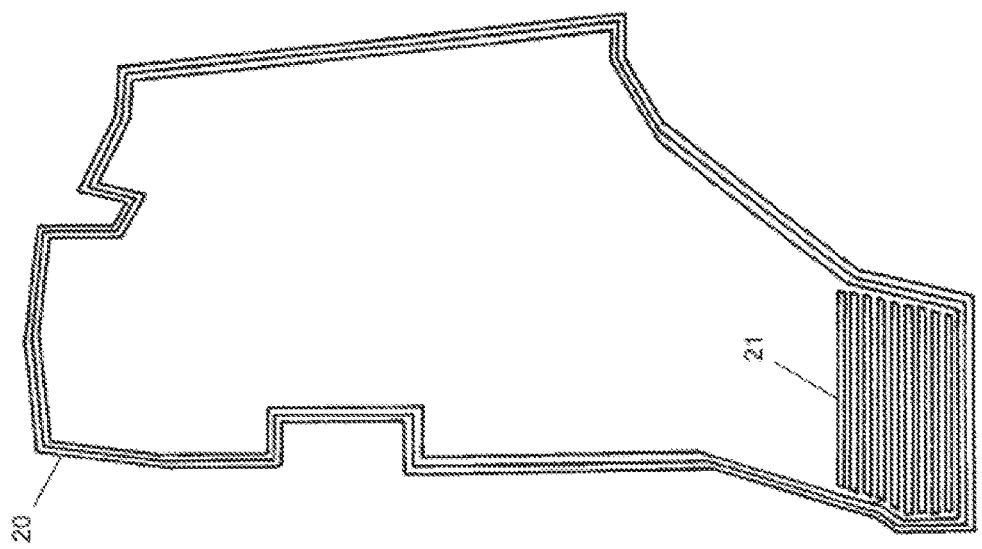
FIG. 2A is a visualization of a path/route with a non-optimal working direction of travel as determined by the prior art.

The instant inventors have recognized that this type of approach generally neglects to discuss or address in detail the initial selection of a working direction(s) of travel on which the full path/routes are based. FIG. 2A illustrates this drawback with a visualization of a machine working path/route 21 that is following a conventional, non-optimal working direction of travel for field boundary 20, i.e., by selecting an initial direction of travel that is parallel to a straight portion of the field boundary. In comparison, FIG. 2B shows the same field boundary 20, with the optimal working direction of travel 22 determined in accordance with embodiments of the present invention. As shown, and as will be described in greater detail hereinbelow, the working direction of travel 22 is one that does not extend parallel to any portion of the field boundary. Rather, it counterintuitively extends nearly orthogonally to the longest straight portion of the boundary, and at an acute angle to the nearest adjacent portion of the field boundary.

Moreover, as also mentioned above, an aspect of the invention was the realization by the instant inventors that conventional approaches for path/route planning, which focus on the shortest distance, the smallest number of turns, the shortest turning distance, the most fuel efficient, and/or the fastest route, etc., surprisingly provide for relatively poor spatial field efficiency. Unlike these conventional approaches, the instant inventors focused on spatial field efficiency, and on the initial working direction(s) of travel, which in many applications has surprisingly eliminated the need to generate a full path/route for the remainder of the field, and the complexities inherent therein.

Figure 3B:
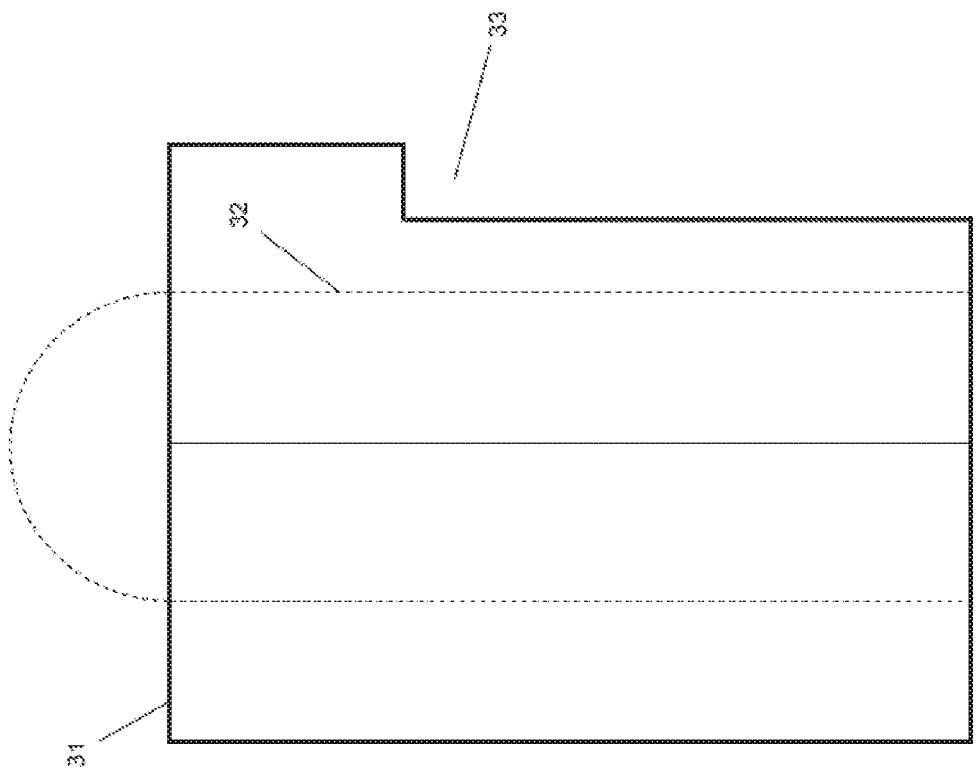
FIG. 3B is a view similar to that of FIG. 3A, of a field boundary with relatively low spatial field efficiency.
Figure 3A:
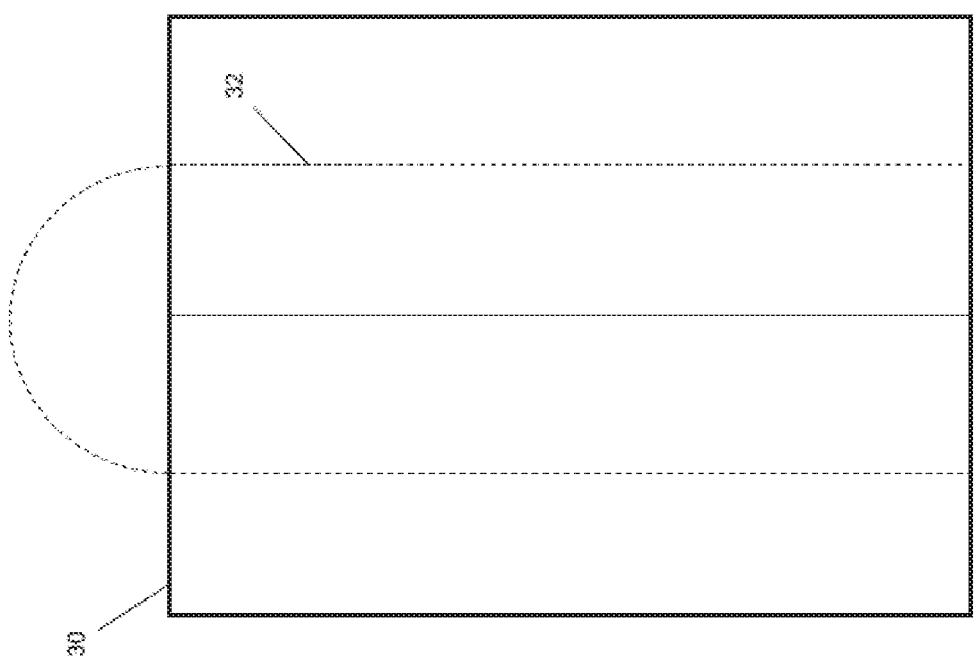
FIG. 3A is a visualization of a field boundary with relatively high spatial field efficiency, in accordance with the teachings of embodiments of the present invention.

FIGS. 3A and 3B illustrate that spatial field efficiency is a measure of total effective area covered for a given field boundary and working machine. FIG. 3A and FIG. 3B show field boundaries 30 and 31, respectively, with the same machine path/route 32. The spatial field efficiency in FIG. 3A, however, is higher than in FIG. 3B due to the cutout 33 causing the operating machine to cover less effective farmable area on field boundary 31 of FIG. 3B. The difference in spatial field efficiency even though the path/route 32 has not changed shows the benefit of selecting spatial field efficiency, rather than for example, path length or smallest number of turns, etc., as the optimization criterion. The inventors have found that spatial field efficiency inherently takes into account a number of the aforementioned optimization criteria all at once. As many of these criteria have been found to be directly related to one another, and ultimately, related to the total effective machine field coverage, the use of spatial field efficiency as an optimization criterion has been found to improve computational efficiency by reducing inputs to the optimization calculation process while still providing desired results.

Moreover, the approach described herein is field-centric, as it uses a particular field's unique geometric features as a starting focal point on which to base the optimization process, and to which specific physical parameters of the working machine and/or farm implements may be added. This type of approach takes into account a field's specific geometric features from the very start in order to help analyze the provided machine inputs to the geometry of the field. An approach such as this provides the ability to not only analyze complicated features of a field but allows the focus of analysis to be directed on those complicated features so that the optimal working direction(s) of travel may be obtained for use in the guidance system of the working machine. In the aforementioned conventional approach, focus has been on developing a complete path/route to merely deal with complicated geometric features, whereas the field-centric approach discussed herein evaluates those features early in the process and reflects those features in the system output in the form of an initial working direction(s) of travel for the machine in the field. Features such as dog-leg shapes, finger-like shapes, and even oval and contoured shapes are geometric features of a field that provide a challenge when planning complete paths/routes, but are easily addressed by the embodiments hereof.

Figure 4:
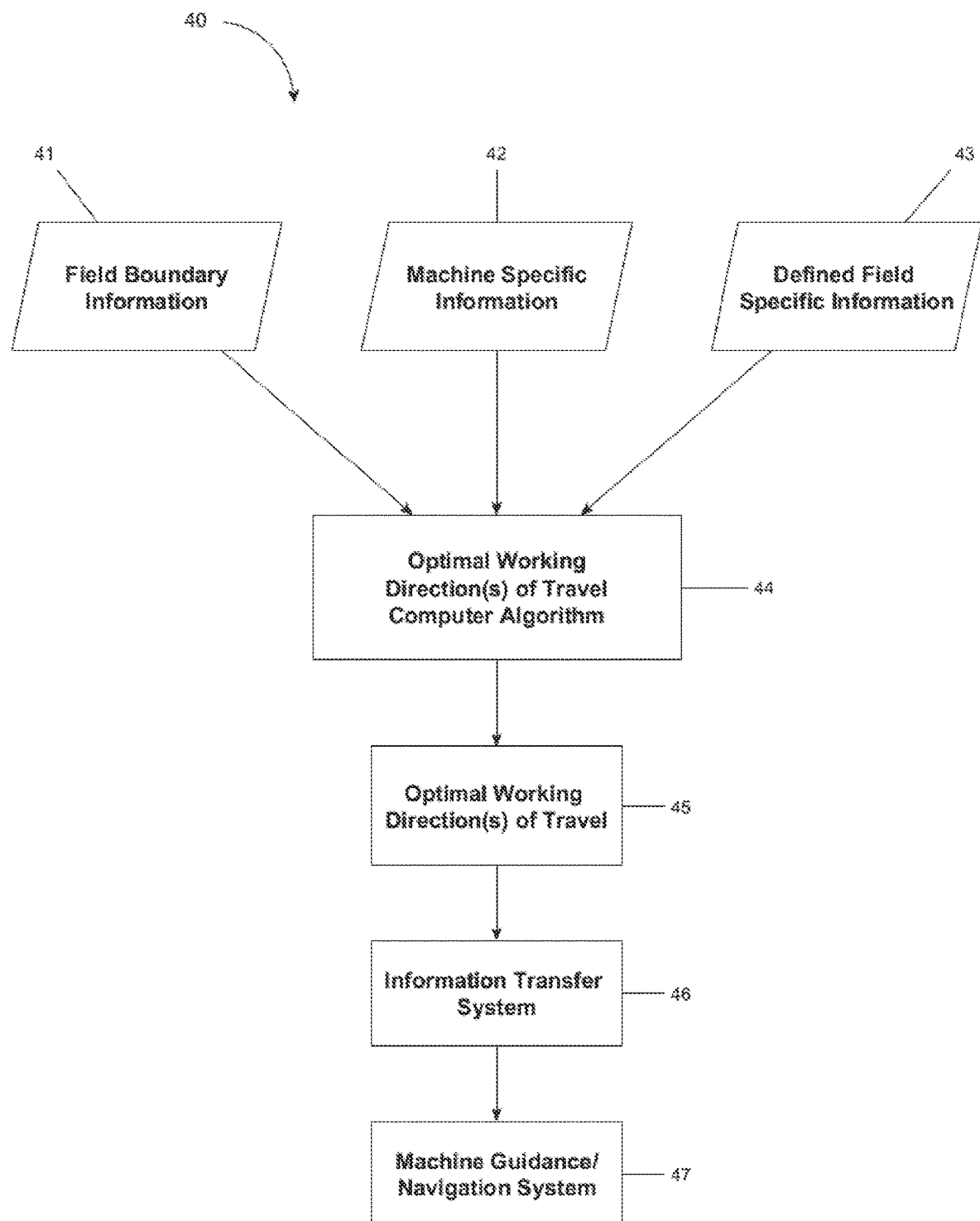
FIG. 4 is a block diagram of a system and method to generate efficient and optimal working direction(s) of travel to be used in a working machine's guidance/navigation system in accordance with embodiments of the present invention.

With the foregoing in mind, FIG. 4 is a workflow overview of a system 40 that determines optimal initial machine working direction(s) of travel within a field boundary in accordance with the present invention, to then be used as the reference of control in coordination with a machine's guidance/navigation system to perform field work. The optimal working direction(s) of travel computer algorithm/engine 44 uses input parameters of field boundary and topographical information 41, machine specific information 42, and defined field specific information 43.

Field boundary and topographic information 41 may include, but should not be limited to, coordinates that define the shape of the outside boundary of the field working area, and any topographical features such as defined inclusions that may represent impassable obstacles, any impassable concavities or convexities, or any other shape defining features that may limit the total farmable area of the field. The machine specific information 42 includes physical parameters of the working machine and/or farm implement such as effective working width, or widths, e.g., in a direction transverse to the working direction(s) of travel of the machine. Other machine specific information may include the machine's speed or range of operational speeds, as well as a description of the capabilities, limitations, equipment complements and linkages, and specific operation types of the working machine. The defined field specific information 43 may include the locations of entrance and exit points along the field boundary that the machine may use to enter and leave the working area, and the number of headland passes along the field boundary by which the machine may circumnavigate the field.

These inputs may then be combined to help provide a detailed description of the geographic nature of the field, including the total farmable area of the field and how it is to be covered by the working machine. This combination of inputs is used by the optimal working direction(s) of travel computer algorithm/engine 44 to generate a plurality of splayed options for initial working direction(s) of travel 53 (FIG. 5) from the parallel pass start point as defined hereinabove. Engine 44 then generates path estimates for the working machine and/or farm implement to travel in order to cover the total farmable field area, with the path estimates respectively extending from and including passes parallel to one of the splayed options. As will be described in greater detail hereinbelow with respect to FIG. 5, engine 44 calculates a spatial field efficiency for each of the path estimates at 54 (FIG. 5), selects the path estimate having highest spatial field efficiency, and designates the splayed option of the path estimate having the highest spatial field efficiency as the desired initial working direction(s) of travel 45 for the particular field geometry. The desired initial working direction(s) of travel 45 may then be transferred, via an information transfer system 46, in any number of ways known to those skilled in the art, to a machine's guidance/navigation system 47 for direct control of the machine when performing field work.

For clarity, system 40 of the present invention is shown and described separately, though in operative communication with, the specialized machine guidance/navigation system 47. However, those skilled in the art should recognize that in particular embodiments, the present invention may take the form of an otherwise conventional guidance/navigation system 47 modified in accordance with the teachings hereof to include elements of system 40. Examples of specialized guidance/navigation systems 47 that may be so modified include a John Deere GreenStar 3 2630 monitor with a John Deere StarFire 3000 GPS receiver (John Deere & Company, Moline, Ill.), Case IH AFS Pro 700 monitor with a Case IH AFS 372 GPS receiver (Case IH, Racine, Wis.), and Ag Leader's InCommand 1200 monitor with an Ag Leader GPS 6500 receiver (Ag Leader Technology, Ames, Iowa).

Figure 5:
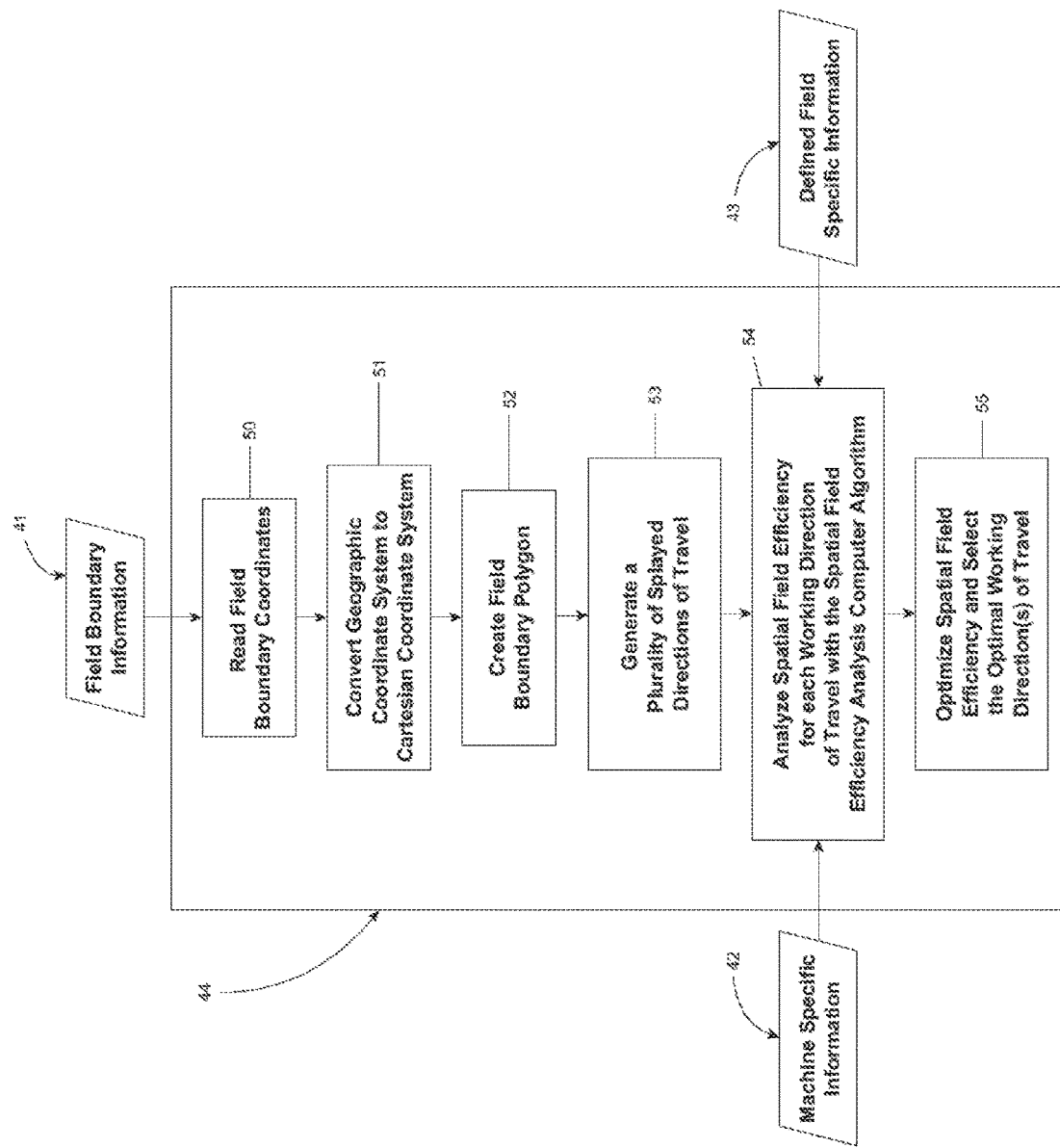
FIG. 5 is a detailed block diagram of the efficient working direction(s) of travel computer algorithm used in embodiments of the present invention.
Figure 6:
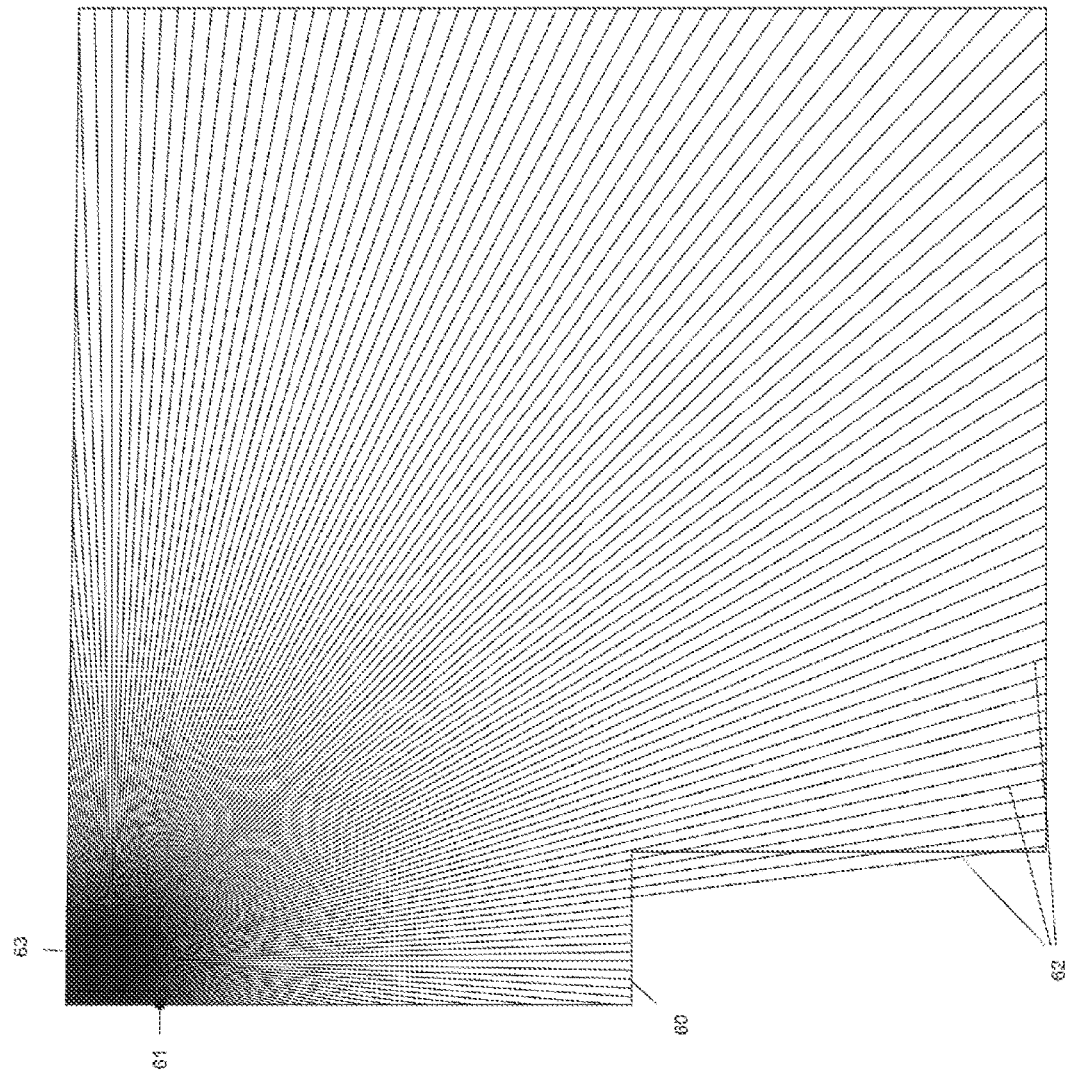
FIG. 6 is a visualization of a field boundary with a plurality of splayed initial working directions of travel in accordance with embodiments of FIGS. 4-5.

Turning now to FIG. 5 embodiments of the optimal working direction(s) of travel engine 44 are described in greater detail. As shown, the algorithm 44 reads the field boundary/data file 50, which may have been created by, but should not be limited to, a working machine capturing boundary coordinates and any significant topological features of the field through the use of a global positioning system (GPS) receiver and/or its navigation system, while traversing the field. Alternatively, the field data file 50 may take the form of a geographical information system (GIS) computer generated map, or CAD file or the like, that is downloaded from third party sources to engine 44. In particular embodiments, this field geometry information in file 50 is then converted from a traditional geographic coordinate system into a Cartesian coordinate system to create a Cartesian file 51. This field geometry file 51 is then used to create a field boundary polygon 52, representing the farmable area of the field. Engine 44 then generates a plurality of splayed options for initial directions of travel 53 for the spatial field efficiency analysis computer algorithm 54 to use. In particular embodiments, the plurality of splayed options for initial working directions of travel include a series of straight lines superimposed onto polygon 52, extending from the parallel pass start point at predetermined angular increments therebetween, such as shown in FIG. 6. As also shown, the splayed options extend over an angular range (e.g., 0° to 180°) at sufficiently small angular increments (e.g., from 0.1° to 3° or more in various embodiments, and in particular embodiments from 0.1° to 1°) to include substantially all possible working directions for the machine to travel within the farmable area from the starting point. FIG. 6 shows an example visualization of a field boundary 60 (polygon 52), including entry/exit 61, with a plurality of splayed options 62 (at 1 degree angular increments) for initial working directions of travel overlaid thereon, extending from a field-specific parallel pass start point 63.

After the optimal working direction(s) of travel algorithm 44 generates a plurality of splayed initial working directions of travel 53, engine 44 uses the machine specific information 42 and field specific information 43 to complete a spatial field efficiency analysis at 54, to identify the desired initial working direction(s) of travel 45 (FIG. 4) from among the splayed options 53.

Figure 7:
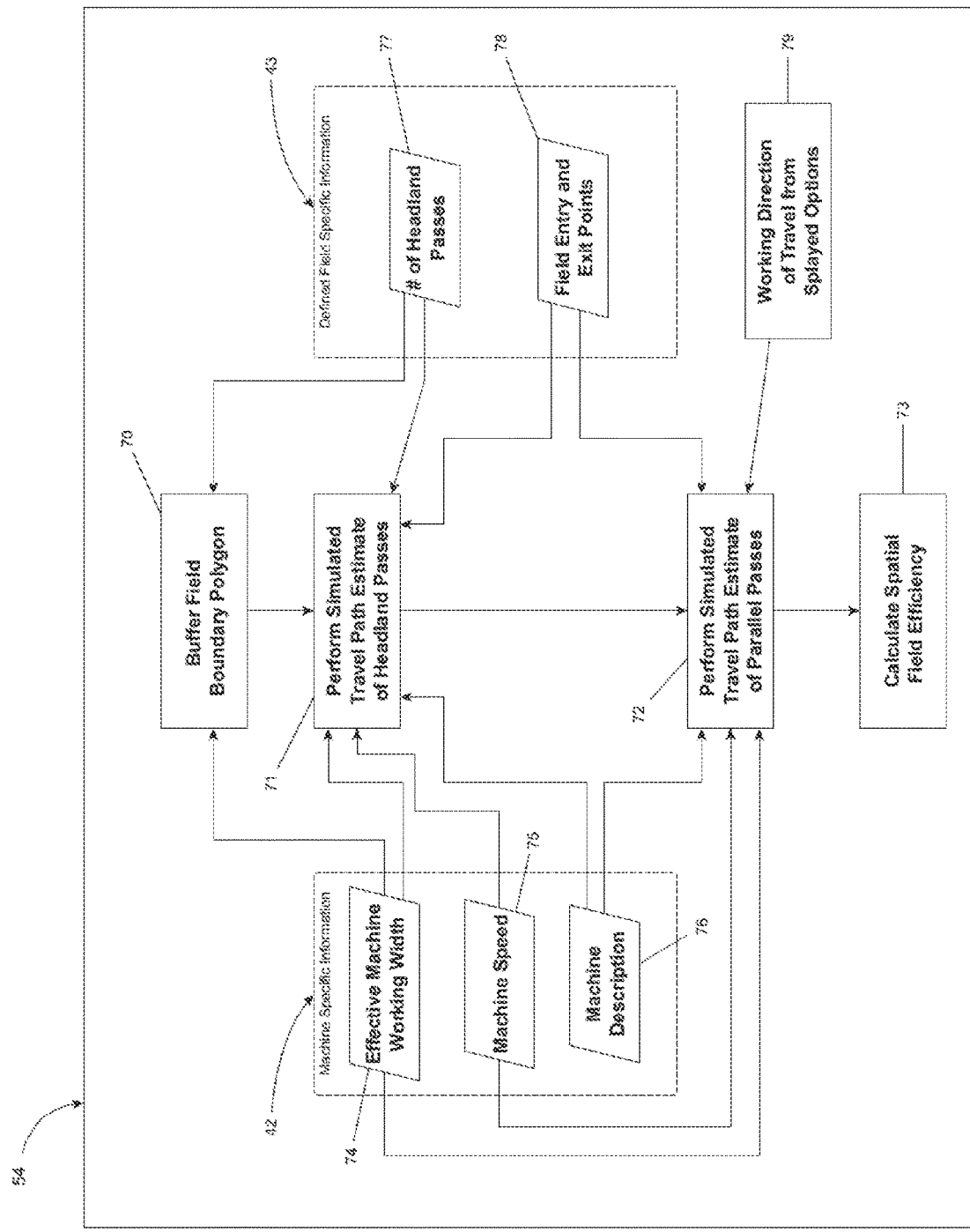
FIG. 7 is a detailed block diagram of the spatial field efficiency analysis computer algorithm in accordance with embodiments of the present invention.

Turning now to FIG. 7, the spatial field efficiency analysis 54 performed by embodiments is shown and described in greater detail. At 70, the field boundary polygon 52 is buffered to obtain both an outer working area that will be covered by estimated headland pass(es) 71 as well as an inner area to be covered by path estimates 72 extending from and including a plurality of passes parallel to a respective one of the splayed options, as discussed below. Machine specific inputs 42 of effective working width 74, in coordination with the number of headland passes 77 from field specific information 43, are used to provide the proper details and dimensions for the buffering process 70. Once the segregation of the headland pass area (if any) and parallel pass area of the field has been identified, the next step is to perform the travel path estimate of the headland passes 71 using spatial simulation techniques of machine movement with or without an attached farm implement. In particular embodiments, the inputs of effective machine working width 74, the number of headland passes 77, and the machine speed 75 are all used for simulation purposes of the path estimate. In these embodiments, machine speed 75 along with the effective working width 74 are used to help simulate the navigation of complex geometrical features by helping to identify the section order of the field to be traversed when a complex feature is presented. The machine speed 75 plays a role in this identification process and can affect total area covered by the agricultural working machine. The machine description 76, such as whether the agricultural work machine is a self-contained work unit with an integral farm implement, e.g., in the form of a self-propelled sprayer, or alternatively, is a tractor pulling a separate farm implement, is a tractor pulling multiple farm implements hooked together in tandem, and/or if there is a limiting type of mechanical linkage, along with a field entrance and/or parallel pass start point (and optionally, exit) location 78, are also used to provide the simulated path estimate. With the help of these parameters, the travel path estimates for each of the splayed options 79 generated at 53 (FIG. 5) may be generated for further analysis. Those skilled in the art will recognize that headland passes 71 allow the machine to have room to make turns at the ends of parallel passes 72, as discussed hereinbelow with respect to FIG. 11. Moreover, although desirable for particular applications, embodiments of the present invention may proceed without headland pass information, without departing from the scope of the present invention. Moreover, particular embodiments may use an estimated machine speed 75 and/or may simply use a predetermined constant for machine speed based on industry averages for various types of working machines, without departing from the scope of the present invention.

The spatial field efficiency for each of the path estimates is calculated by comparing the total farmable field area to the area covered by the agricultural work machine and farm implement when following the path estimates, using the formula $$\text{Spatial Field Efficiency (\%)} = \frac{\text{Farmable Area of the Field}}{\text{Total Area Covered by the Farm Implement}} * 100$$

Figure 8A:
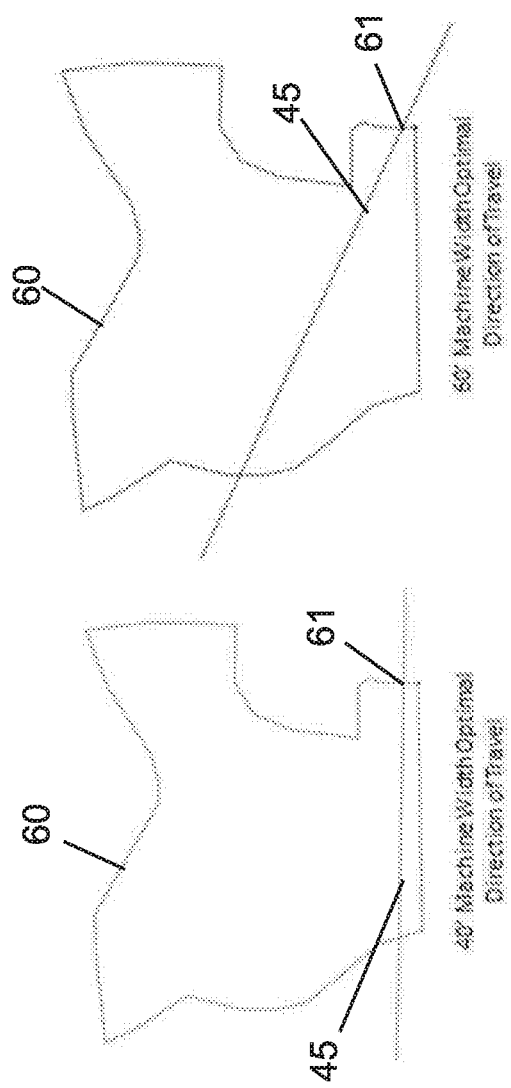
FIG. 8A is a visualization of optimal working directions of travel generated for farm implements of varying dimensions, for an exemplary field boundary, in accordance with embodiments of the present invention.
Figure 8B:
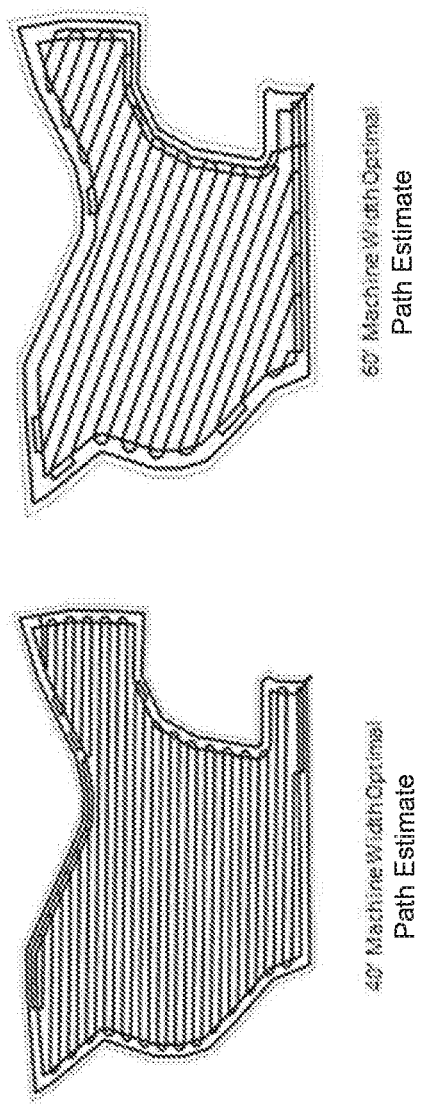
FIG. 8B is a view similar to that of FIG. 8A, with path estimates for each of the generated optimal working directions of travel of FIG. 8A.

Once all of the splayed options 79 have been evaluated for spatial field efficiency, the selection of the optimal/desired working direction(s) of travel occurs at 55 (FIG. 5). As discussed hereinabove, the instant inventors have recognized that spatial field efficiency of a particular path estimate for a particular field, is predominantly dependent on the initial working direction(s) of travel from the field specific parallel pass start point. Accordingly, embodiments of the present invention are configured to use the foregoing spatial field efficiency calculations to determine a desired initial working direction(s) of travel. In various embodiments, no further information need be provided to the guidance system of the agricultural work machine, since subsequent passes will largely be parallel to the initial desired working direction(s) of travel 55, and any subsequent variations in travel path made by the machine operator and/or by conventional automated steering systems should have relatively minor effect on spatial field efficiency. FIG. 8A shows a visualization of the selected optimal working direction of travel 45 overlaid on a field boundary 60 with the entrance and exit point of the field boundary 61, for farm implements of varying transverse dimension, i.e., 40 feet and 60 feet, which would be common for changing 30 inch corn row planters from a 16 row to a 24 row device. The estimated paths for which spatial field efficiency was calculated to identify these optimal working directions of travel 45 are shown in FIG. 8B. It should be evident that these optimal working directions of travel are not intuitive. The intuitive approach that most farmers would take to farm this field would be to follow the long straight edge on the bottom of the field, whereas the optimal working direction of travel for the 40 foot implement is actually an acute angle relative to the edge. As also shown in these examples, changing only one parameter, i.e., the size of the implement, has a dramatic effect on the optimal initial working direction of travel. It should also be noted that because the paths beyond the initial working directions of travel as shown in FIG. 8B are only estimates used to calculate spatial field efficiency, there is no need to calculate precise turns or to provide the granularity needed to actually guide an agricultural work machine. For example, particular embodiments simply insert interpolated connectors as turns between adjacent parallel passes, such as in the form of generic rectangles or semi-circles, without regard to whether or not an agricultural work machine would be able to follow them in the field. Similarly, each pass may be effectively defined by only two data points, i.e., one at each end, rather than generating a series of closely spaced points useable for machine guidance. Avoiding the need for the precision and granularity needed for machine guidance when generating path estimates enables the instant embodiments to function with relatively little processing overhead, e.g., to provide substantially real-time results when switching agricultural work machines/implements. As switching implements on the fly is a common situation in agriculture, namely due to weather and/or equipment availability, a new initial working direction(s) of travel can be quickly and easily calculated and loaded into the navigation system of the agricultural work machine, to provide a timeliness advantage over recalculating an entire point to point working path for the new working width.

It should be noted that particular embodiments of the present invention may operate without some of the inputs described hereinabove. For example, machine speed 75, machine description 76, and the number of headland passes 77 may be omitted, or may be pre-set to model typical operating characteristics of any number of conventional agricultural machines, or of an average of such typical machines. These input parameters would thus not be needed as direct inputs for the travel path estimate to determine the optimal working direction(s) of travel 45 for the given field boundary information 41.

As also mentioned hereinabove, and referring back to FIG. 4, the optimal working direction(s) of travel 45 may then be converted into a format usable by a machine guidance/navigation system 47. This format in most cases is, but should not be limited to, a geographical directional heading in degrees or an AB line which provides two points, an A and B point, in decimal degrees for the machine's guidance/navigation system to reference and control the machine. After the optimal working direction(s) of travel has been converted into one of the aforementioned formats, the optimal working direction(s) of travel 45 may be transferred to the working machine via an information transfer system 46. This information transfer system 16 may be a manual process which the machine operator performs by entering the optimal working direction(s) of travel 45 into an on-board machine monitor, or an automatic process that is completed wirelessly, e.g., via cellular or Wi-Fi services. This transfer system may also be a mixture of the two. In any event, the transfer methods of information 46 into an agricultural working machine are well known and may occur manually, autonomously, wirelessly, or in any mixture thereof without limiting the scope of the present invention.

FIG. 9 is a visualization of a typical and well known machine guidance/navigation system 47 for an agricultural work machine 91 and farm implement with which embodiments of the present invention may be integrated. In this example, work machine 91 takes the form of a tractor in operative engagement with a separate farm implement. Those skilled in the art will recognize that working machine 91 may take any number of forms, such as a tractor pulling multiple farm implements in tandem, or a self-contained machine having an integral farm implement such as a sprayer, e.g., in the form of a self-propelled sprayer.

After the transfer of the optimal working direction(s) of travel 45 via the information transfer system 46, the machine's guidance/navigation system 47 uses an on-board GPS receiver 93, e.g., of a type that is well known in the agricultural industry, to collect signals from GPS satellites 94 to compare its current location and position to the desired working direction(s) of travel 45 while performing field work. Examples of commercially available on-board GPS receivers 93 suitable for use with embodiments of the present invention include the Ag Leader GPS 6500 (Ag Leader Technology, Ames, Iowa), John Deere StarFire 3000 and 6000 (John Deere & Company, Moline, Ill.), and Case IH AFS 372 (Case IH, Racine, Wis.). Any adjustments that need to be made to correct the machine's proper trajectory to the optimal working direction(s) of travel 45 may be made with the agricultural work machine's automated steering control system 92. These automated steering systems are also well known, commercially available, and may include, but should not be limited to, models such as Ag Leader SteerCommand, John Deere AutoTrac, and Case IH AccuGuide.

Figure 10:
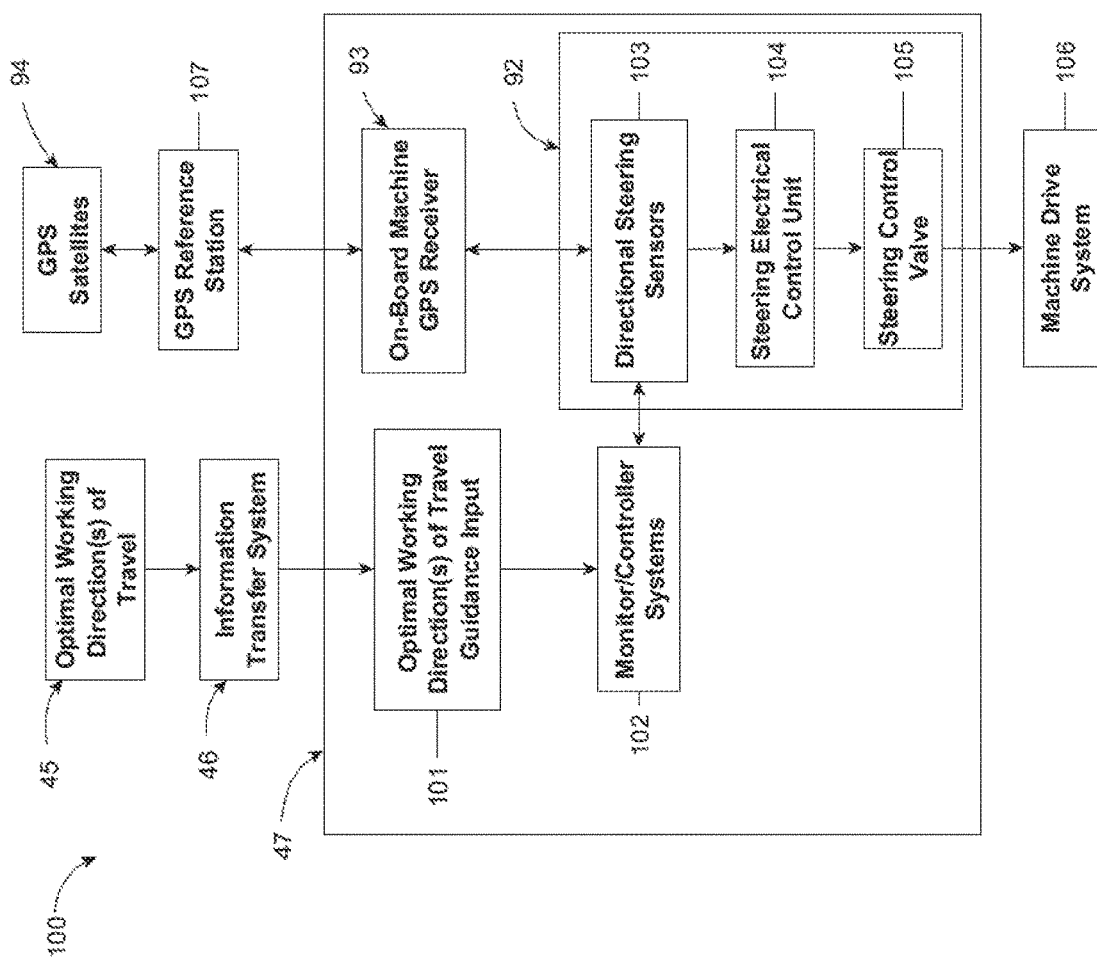
FIG. 10 is a detailed block diagram of a working machine's guidance/navigation system in accordance with embodiments of the present invention.

This machine control may also be seen more specifically within FIG. 10 which contains a detailed block diagram of the machine guidance/navigation system 100. This diagram details the optimal working direction(s) of travel 45, and the information transfer system 46 into the machine guidance/navigation system 47. The optimal working direction(s) of travel guidance input 101 is entered into the system through the monitor/controller system 102. These monitor/controller systems are, once again, well known and commercially available within the agricultural industry and contain user interface displays for the operator to interact with. A few examples of these monitor/controller systems 102 include, but should not be limited to, John Deere GreenStar 3 2630, Case IH AFS Pro 700, and Ag Leader's InCommand 1200. These monitor/controller systems 102 allow the operator to view and control information from different systems on the agricultural machine while performing field work. A major piece of information that these monitor/controller systems 102 are linked with are the steering and GPS based systems within the agricultural machine. As the GPS satellites 94 provide signals to the GPS on-board machine receiver 93 they pass through a GPS reference station 107 to correct the GPS signal for the true location and position. The on-board receiver 93 collects this corrected signal and then passes the signal to the directional steering sensors 103 and the monitor/controller system 102. At this point the work machine 91 is comparing the location and position of itself received by the GPS signals to properly calculate its trajectory and directional heading. At this point is where the comparison of the optimal working direction(s) of travel 45 that has been entered into the monitor/controller system 102 is compared with the current location and trajectory of working agricultural machine 91. If adjustments to the trajectory need to be made to comply with the optimal working direction(s) of travel 45 then the directional steering sensors 103 notify the steering electrical control unit 104 to send a message to the steering control valve 105 to adjust the wheels of the machine to the proper angle for re-alignment to the proper optimal working direction(s) of travel. The new wheel steering angle is then achieved and sent to the machine drive system 106 to continue progress of performing work on the field boundary in the optimal working direction(s) of travel 45.

It should be noted that in particular embodiments the agricultural work machine may not have auto guidance and auto-steer capabilities but rather a manual operator that follows the optimal working direction(s) of travel 45. In this embodiment the operator could use a monitor/controller system 102 if available to manually follow the working direction(s) of travel that has been entered therein for manual machine guidance.

It should thus be recognized that once having been provided with the optimal initial working direction(s) of travel 45, the user may manually and/or with conventional driving aids, direct the agricultural work machine throughout the remainder of the field. As mentioned above, those skilled in the art will recognize that many conventional agricultural work machines 91 include driving aids such as those described hereinabove that, e.g., automate 180 degree turns at the ends of passes, and use previous passes to guide subsequent parallel passes, such as may be used to complete a series of passes extending parallel to the initial working direction(s) of travel 45. Indeed, in particular embodiments, the guidance provided by system 40 is terminated once the agricultural work machine has followed the desired working direction(s) of travel substantially completely across the farmable field area. Thereafter, system 40 hands off guidance of the agricultural work machine to an operator and/or to the conventional operation of guidance system 47, such as to automatically turn and direct the agricultural work machine to complete passes parallel to the desired working direction(s) of travel. Moreover, in particular embodiments, guidance may be interrupted to temporarily transfer guidance to an operator, followed by resumption of guidance by system 40. For example, machine guidance may be interrupted to enable an operator to manually make a turn after completing an initial pass (or between subsequent parallel passes), followed by re-establishing machine guidance as discussed hereinabove. Indeed, one skilled in the art will recognize that if desired, a user may interrupt machine guidance and use system 40 to calculate a new initial working direction of travel 'on the fly', i.e., at any time while conducting farming operations on the field. This is made possible by the aforementioned efficient processing and near real-time performance capabilities of the instant embodiments.

FIG. 11 is a visualization of the machine guidance process on a field boundary 60 that contains travel path estimates for the headland passes 110, a parallel pass area 111, and the optimal working direction of travel referenced by 112. It also shows an agricultural work machine 91 performing work on a field boundary 60 that is being guided by the optimal working direction of travel 45 and that is denoted by numeral 113.

Figure 12:
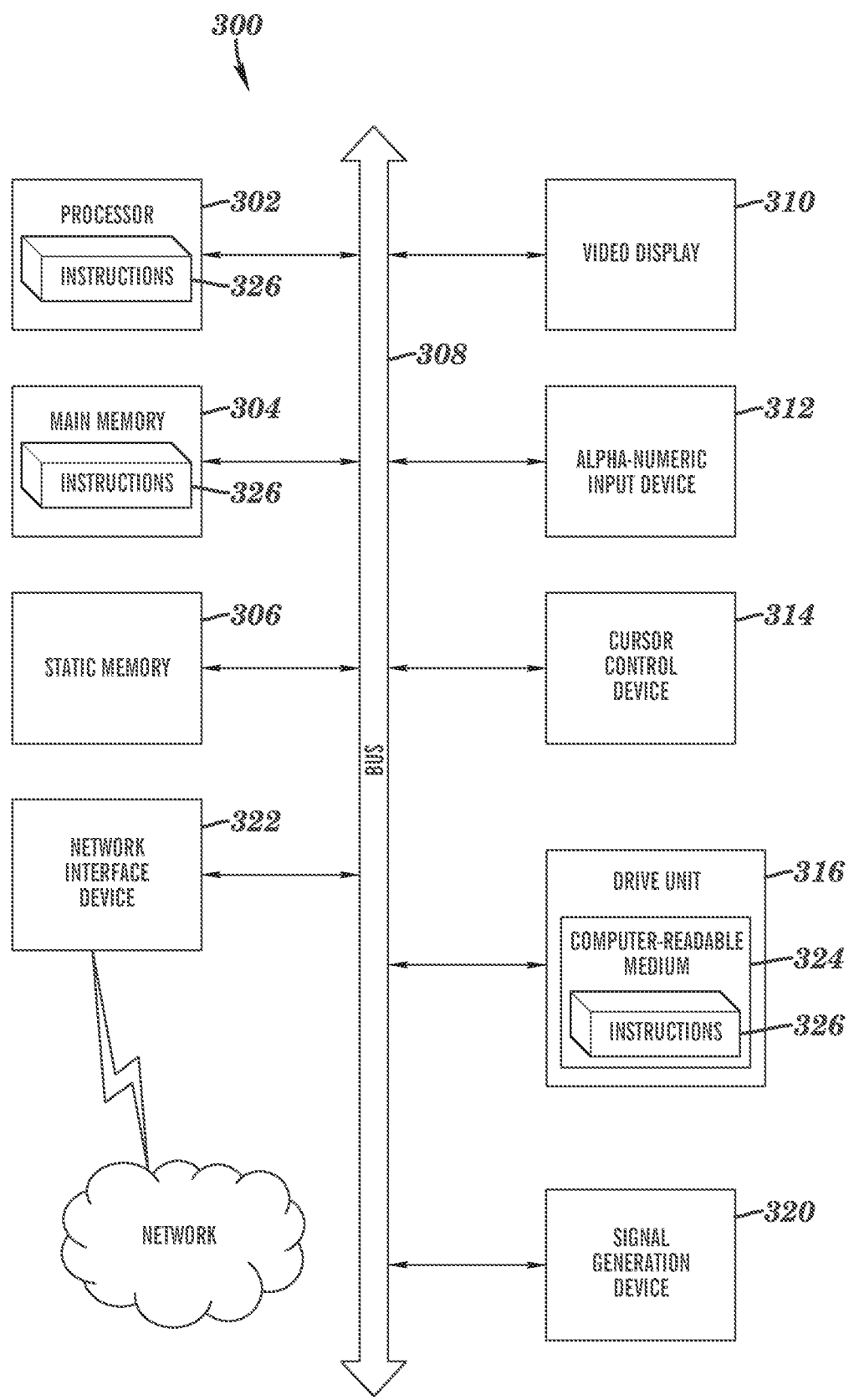
FIG. 12 is a schematic diagram of a machine within which one or more aspects of the invention may be embodied.

FIG. 12 shows a diagrammatic representation of a machine in the exemplary form of a computer system 300 within which a set of instructions, for causing the machine to perform methodologies discussed above, may be executed.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention, and as further described hereinbelow.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

Embodiments of the present invention also relate to an apparatus for performing the operations herein. This apparatus may be specially constructed for the required purposes, or it may comprise a computer selectively activated or reconfigured by a computer program stored on a computer readable medium that may be accessed by the computer. Such a computer program may be stored in a tangible, non-transitory, computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), any other appropriate static, dynamic, or volatile memory or data storage devices, or other type of media suitable for storing electronic instructions, and each coupled to a computer system bus. Furthermore, the computers referred to in the specification may include a single processor or may be architectures employing multiple processor designs for increased computing capability.

Various systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims. It should be further understood that any of the features described with respect to one of the embodiments described herein may be similarly applied to any of the other embodiments described herein without departing from the scope of the present invention.

Having thus described the invention, what is claimed is:

1. A specialized machine guidance apparatus for completing farming operations on a field with operational and spatial field efficiency, the apparatus comprising:

a guidance system disposed in communication with a GPS receiver of an agricultural work machine having a farm implement configured to effect farming operations as the agricultural work machine traverses the field, the guidance system having a memory and a processor, wherein the memory includes a stored program executable by the processor, the stored program configured to:
  (a) capture a boundary and topographical features of the field, to generate a total farmable field area;
  (b) capture physical parameters of the farm implement, including a dimension transverse to forward movement of the agricultural work machine as the agricultural work machine traverses the field;
  (c) identify a parallel pass start point along the field boundary, usable by the agricultural work machine to begin farming operations with parallel passes traversing the field;
  (d) generate a plurality of splayed options for initial directions of travel from the parallel pass start point;
  (e) generate a plurality of path estimates for the agricultural work machine with said physical parameters to travel to cover the total farmable field area, each of the path estimates extending from and including a plurality of passes parallel to a respective one of the splayed options;

(f) calculate a spatial field efficiency for each of the path estimates by comparing the farmable field area to the area covered by the farm implement when following the path estimates, using the formula:

Spatial Field Efficiency %=(Farmable Area of the Field)/(Area Covered by the Farm Implement) *100;

(g) select the path estimate having highest spatial field efficiency and designate the splayed option of the path estimate having the highest spatial field efficiency as the desired initial working direction of travel;

(h) instruct the agricultural work machine to commence farming operations by moving from the parallel pass start point in the desired initial working direction(s) of travel.

2. The apparatus of claim 1, further comprising:
the agricultural work machine configured for traversing the field;
the farm implement operationally engaged with, and operated by, the agricultural work machine to effect farming operations as the agricultural work machine traverses the field; and
the GPS receiver disposed on the agricultural work machine.

3. The apparatus of claim 2, wherein the guidance system is disposed on the agricultural work machine.

4. The apparatus of claim 2, wherein said capture (a) comprises using the GPS receiver to capture GPS coordinates of the boundaries and topographical features of a field as the agricultural work machine traverses the field.

5. The apparatus of claim 1, wherein said capture (a) comprises capturing coordinates of the boundaries and topographical features of a field from a map.

6. The apparatus of claim 1, wherein each of the plurality of passes extends across the farmable field area within the boundary.

7. The apparatus of claim 6, wherein each of the path estimates comprise interpolated connectors disposed between adjacent ones of said plurality of passes.

8. The apparatus of claim 1, wherein said instruct (h) comprises converting the desired working direction of travel into a format usable by the guidance system.

9. The apparatus of claim 8, wherein the guidance system is configured to capture GPS coordinates in real-time to direct the agricultural work machine to follow the desired working direction of travel.

10. The apparatus of claim 9, wherein the guidance system is configured to terminate guidance of the agricultural work machine once the agricultural work machine has followed the desired working direction of travel substantially completely across the farmable field area.

11. The apparatus of claim 10, wherein the guidance system is configured to hand off guidance of the agricultural work machine to an operator upon termination or interruption of guidance.

12. The apparatus of claim 9, wherein the guidance system is configured to automatically turn and direct the agricultural work machine to complete passes parallel to the desired working direction of travel upon termination of guidance.

13. The apparatus of claim 1, wherein said capturing (b) further comprises capturing a speed at which the farm implement is capable of traversing the field.

14. The apparatus of claim 1, wherein said identify (c) further comprises identifying at least one exit point along the field boundary, usable by the agricultural work machine to exit the field.

15. The apparatus of claim 1, further comprising identifying or generating at least one headland pass estimate along the field boundary usable by the agricultural work machine to circumnavigate the field and including the one or more headland passes in said calculate (f).

16. A method for completing farming operations on a field with operational and spatial field efficiency, the method comprising:
providing a specialized machine guidance system including a memory and processor, the memory including a stored program executable by the processor; and
executing the stored program of the guidance system to:
(a) capture a boundary and topographical features of the field, to generate a total farmable field area;
(b) capture physical parameters of a farm implement, including a dimension transverse to forward movement of an agricultural work machine operationally engaged with the farm implement as the agricultural work machine traverses the field;
(c) identify an entrance point along the field boundary, usable by the agricultural work machine to enter the field;
(d) generate a plurality of splayed options for initial working directions of travel from the parallel pass start point;
(e) generate a plurality of path estimates for the agricultural work machine with said physical parameters to travel to cover the total farmable field area, each of the path estimates extending from and including a plurality of passes parallel to a respective one of the splayed options;
(f) calculate a spatial field efficiency for each of the path estimates by comparing the farmable field area to the area covered by the farm implement when following the path estimates, using the formula:

Spatial Field Efficiency %=(Farmable Area of the Field)/(Area Covered by the Farm Implement) *100;

(g) select the path estimate having highest spatial field efficiency and designate the splayed option of the path estimate having the highest spatial field efficiency as the desired initial working direction of travel; and
(h) instruct the agricultural work machine to commence farming operations by moving from the parallel pass start point in the desired initial working direction of travel.

17. The method of claim 16, further comprising:
providing the agricultural work machine having a GPS receiver thereon;
communicably coupling the GPS receiver to the specialized machine guidance system; and
operationally engaging and operating the farm implement with the agricultural work machine.

18. The method of claim 17, further comprising disposing the guidance system on the agricultural work machine.

19. The method of claim 17, wherein said capture (a) comprises using the GPS receiver to capture GPS coordinates of the boundaries and topographical features of a field as the agricultural work machine traverses the field.

20. The method of claim 16, wherein said capture (a) comprises capturing coordinates of the boundaries and topographical features of a field from a map.

21. The method of claim 16, wherein each of the plurality of passes extends across the farmable field area within the boundary.

22. The method of claim 21, wherein each of the path estimates comprise interpolated connectors disposed between adjacent ones of said plurality of passes.

23. The method of claim 16, wherein said instruct (h) comprises converting the desired working direction of travel into a format usable by the guidance system.

24. The method of claim 23, wherein the guidance system is configured to capture GPS coordinates in real-time to direct the agricultural work machine to follow the desired working direction of travel.

25. The method of claim 24, wherein the guidance system is configured to terminate guidance of the agricultural work machine once the agricultural work machine has followed the desired working direction of travel substantially completely across the farmable field area.

26. The method of claim 25, wherein the guidance system is configured to hand off guidance of the agricultural work machine to an operator upon termination or interruption of guidance.

27. The method of claim 24, wherein the guidance system is configured to automatically turn and direct the agricultural work machine to complete passes parallel to the desired working direction of travel upon termination of guidance.

28. The method of claim 16, wherein said capturing (b) further comprises capturing a speed at which the farm implement is capable of traversing the field.

29. The method of claim 16, wherein said identify (c) further comprises identifying at least one exit point along the field boundary, usable by the agricultural work machine to exit the field.

30. The method of claim 16, further comprising identifying or generating at least one headland pass estimate along the field boundary usable by the agricultural work machine to circumnavigate the field and including the one or more headland passes in said calculate (f).

* * * * *